United States Patent [19]

Watanabe et al.

[11] Patent Number: 5,223,277
[45] Date of Patent: Jun. 29, 1993

[54] APPARATUS FOR CUTTING AN ENVELOPED BODY

[75] Inventors: Masahiko Watanabe; Kazuyoshi Onoguchi; Yasunori Tashiro, all of Utsunomiya, Japan

[73] Assignee: Rheon Automatic Machinery Co., Ltd., Utsunomiya, Japan

[21] Appl. No.: 970,527

[22] Filed: Nov. 2, 1992

Related U.S. Application Data

[63] Continuation of Ser. No. 747,155, Aug. 16, 1991, abandoned.

[30] Foreign Application Priority Data

| Sep. 12, 1990 | [JP] | Japan | 2-241510 |
| Oct. 6, 1990 | [JP] | Japan | 2-268643 |
| Oct. 8, 1990 | [JP] | Japan | 2-105715 |
| Oct. 12, 1990 | [JP] | Japan | 2-107029 |

[51] Int. Cl.⁵ .............................. B29C 47/06
[52] U.S. Cl. .................... 425/132; 83/646; 264/167; 425/142; 425/308
[58] Field of Search ............... 425/382 N, 132, 287, 425/308; 264/167; 426/512, 516; 72/254, 255, 468; 83/646, 647.5

[56] References Cited

U.S. PATENT DOCUMENTS

| 1,922,770 | 8/1933 | Kornbrath | 72/468 |
| 2,578,229 | 12/1951 | Clement et al. | 72/468 |
| 2,664,996 | 1/1954 | Andrews | 72/468 |
| 3,509,785 | 5/1970 | Fuchs, Jr. | 72/468 |
| 3,628,449 | 12/1971 | Phillips, Jr. | 72/468 |
| 3,901,641 | 8/1975 | Onder | |
| 3,954,033 | 5/1976 | Tipton et al. | 83/646 |
| 4,734,024 | 5/1988 | Tashiro | 425/132 |
| 4,767,304 | 8/1988 | Tashiro | 425/308 |
| 4,767,305 | 8/1988 | Tashiro | 425/308 |

FOREIGN PATENT DOCUMENTS

| 230368 | 7/1987 | European Pat. Off. |
| 1109137 | 4/1968 | United Kingdom |

Primary Examiner—David A. Simmons
Assistant Examiner—William J. Matney, Jr.
Attorney, Agent, or Firm—Guy W. Shoup; Patrick T. Bever

[57] ABSTRACT

An improved apparatus for cutting an enveloped body, which consists of an assembly having at least three circumferentially disposed cutting members, each cutting member having at least two sliding surfaces. The cutting members are assembled in sliding contact with each other such that the sliding surfaces of adjacent cutting members are slidable along each other so as to form or close a central opening surrounded by the cutting members. The opening is opened and closed for cutting the enveloped body passing therethrough. One sliding surface of a cutting member forms a convex surface, and the other sliding surface forms a concave surface complementary to the convex surface, so that the convex surface of a cutting member slides on the concave surface of an adjacent cutting member.

8 Claims, 12 Drawing Sheets

APPARATUS FOR CUTTING AN ENVELOPED BODY

This application is a continuation of application Ser. No. 07/747,155, filed Aug. 16, 1991, now abandoned.

FIELD OF THE INVENTION

This invention is in general for an apparatus for cutting an enveloped body. More especially, it is for an apparatus for cutting a bar-shaped continuous cake dough crust that envelopes a filling such as bean jam, to produce spherical products with a smooth outer cover, without generating the problem of flower-like patterns formed on the outer cover, as well as without generating the problem of a filling protruding from the dough.

BACKGROUND OF THE INVENTION

Various methods and apparatuses have been taught to cut an enveloped bun-like body by using a continuously fed two-layer material, such as is disclosed in U.S. Pat. Nos. 4,734,024, 4,767,304 and 4,767,305. For example, U.S. Pat. No. 4,734,024 discloses an apparatus for shaping a round body consisting of a dough coating and a filling. It comprises an assembly comprising a plurality of circumferentially disposed members combined to shape a spherical body. Each of the members has at least two sliding surfaces. They are so combined that a sliding surface of one member is slidable on a sliding surface of another member, that by sliding the members an opening is formed or closed in the center of the assembly, and that the opening is confined by walls consisting of the inwardly exposed part of the sliding surface of the members and is of a cross-sectional area. When the opening is completely open it is sufficiently large so as to pass a descending cylindrical body.

While cutting a spherical body by the assembly of slidable members of the prior art is effective, particularly in precluding a member from intruding into the body and thereby breaking the outer layer of the cylindrical body to expose the filling, it has certain disadvantages. Due to configurative and mechanical reasons in both the slidable members and in their assembly, a flower-like pattern is formed on the outer cover when a bar-shaped dough is cut. If a product with an even and smooth outer cover is to be produced, the product must be finished through extra manual work or other means. Also, if a product with a thin outer cover is to be produced, there are cases in which the filling is not completely covered and it is exposed at the center on both the top and bottom of the product, even when a thick dough material is used. Further, these cutting apparatuses may not be ideal for a continuous cutting operation. This is because when a bar-shaped dough material is continuously processed through them for a long time, the dough materials are likely to burn due to the frictional heat generated between slidable members, and they stick to the assembly and interrupt the operation.

Accordingly, one of the objects of this invention is to provide an improved apparatus for cutting a double-layered bar-shaped dough product into double-layered spherical products that eliminates flower-like patterns that are formed on the outer covers of products.

Another object of this invention is to provide an improved apparatus for cutting a double-layered bar-shaped dough product with a very sticky or a highly elastic dough into double-layered spherical products without causing any of the other prior art problems.

Still another object of this invention is to provide an improved apparatus for cutting a double-layered bar-shaped dough product into double-layered spherical products. The apparatus consists of an assembly having at least three circumferentially disposed cutting members, each with at least two sliding surfaces. The members are assembled in sliding contact with each other such that the sliding surfaces of adjacent cutting members are slidable along each other so as to form or close a central opening surrounded by the members. The opening is first opened, and then closed to cut the enveloped body passing through it. One sliding surface of a cutting member forms a convex surface and the other sliding surface forms a concave surface. The convex surface of a cutting member is arranged to slide on the concave surface of an adjacent cutting member and to face the opening when it is opened.

In a preferred embodiment, each of the sliding surfaces facing the opening has a cutout at its outer end.

In another preferred embodiment, the apparatus further comprises a housing for receiving the assembly so constructed that the outer surfaces of the cutting members that form the outer envelope of the assembly slidingly abut the inner surface of the housing.

In another preferred embodiment, the apparatus further comprises a driving means to move the assembly up and down at the same time that the assembly opens and closes.

DETAILED DESCRIPTION OF THE INVENTION

Figure 1:
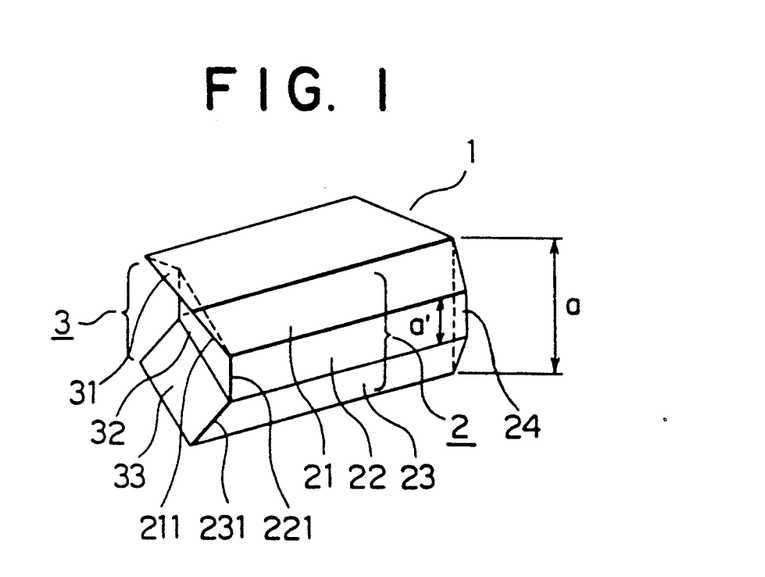
FIG. 1 is a perspective view of a cutting member of an embodiment of this invention.

An example of the cutting member 1 is shown in FIG. 1. It is a polyhedral body with eleven planes. It is formed by cutting a hexahedral body with trapezoidal top and bottom planes running parallel to each other, and rectangular side planes. The height of the side planes, namely, the thickness of the cutting member, is a. The edge between the top plane (first planar surface) and a side plane bordering the bottom of the top plane is beveled to provide a new plane that runs parallel to the two planes at angles to them. Likewise, the edge between the bottom plane (second planar surface) and the same side plane is also beveled to provide a new plane that runs parallel to the two planes at angles to them. Thus, the original side plane of the hexahedral body is reduced in width. This plane and the newly-formed two planes, form a convex sliding surface 2. It consists of an upper surface (first beveled surface) 21, a middle surface (raised central surface) 22, and a lower surface (second beveled surface) 23. The side plane of the hexahedral body that borders the top plane at its left side edge is hollowed into three planes. They run parallel to the same side edge. The three planes form a concave sliding surface 3. It consists of an upper surface (third beveled surface) 31, a middle surface (indented central surface) 32, and a lower surface (fourth beveled surface) 33. The convex sliding surface 2 and the concave sliding surface 3 are formed to be complementary.

Figure 2A:
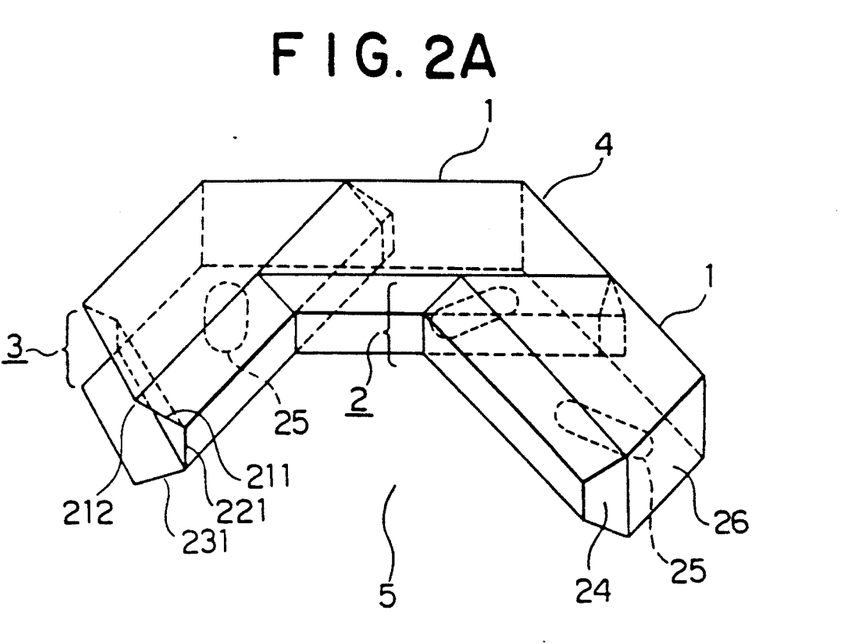
FIG. 2A shows partially assembled cutting members, one of which is shown in FIG. 1.

Referring to FIGS. 1 and 2A, the part of the cutting member 1 where the convex sliding surface 2 meets the (first) side 26 that is positioned opposite the concave side surfaces 3 is cut to form a cutout (beveled side surface) 24. It is at angles to the side 26 and the three surfaces 21, 22, and 23.

Figure 3:
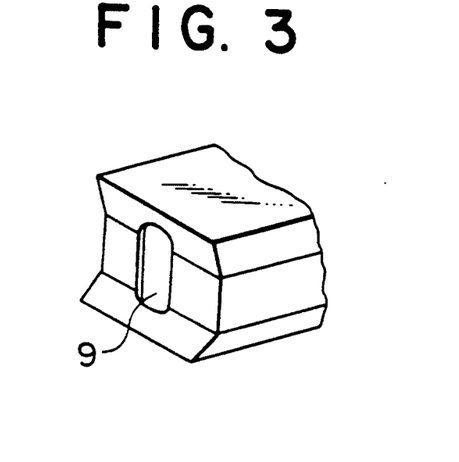
FIG. 3 is a perspective view of a part of a cutting member. This view shows a recess for retaining lubricating oil.

As shown in FIG. 3, the cutting member 1 may have a recess 9 to retain lubricating oil.

At least three identical cutting members can be assembled to form an assembly for the apparatus of this invention. Any change in the number of cutting members forming an assembly necessitates a change in their form. The cutting member 1 mentioned above can function as a part of an assembly for the apparatus of this invention when six of them are used. The number of cutting members is preferably 6 to 12.

In FIG. 2A the cutting members 1 are circumferentially arranged in a uniform orientation relative to each other so that the convex sliding surface 2 of a cutting member 1 slides over the concave sliding surface 3 of an adjacent cutting member 1, in the manner shown in FIG. 2A, wherein the cutting member 1 at the right abuts the cutting member 1 in the middle, and the concave sliding surface 3 of the right-hand cutting member is in a sliding relationship with the convex sliding surface 2 of the cutting member in the middle. The side of the right-hand cutting member that is opposite its convex sliding surface is positioned on the same plane as the side of the middle cutting member that is opposite its concave sliding surface. The positional relationship between the cutting member in the middle and that on the left side is the same. When six cutting members are arranged in this manner, an opening is formed in the center of the assembly. This opening is surrounded by the inwardly exposed parts of the convex sliding surfaces 2 of the cutting members. If the right-hand cutting member slides over the middle cutting member to the left, and the other cutting members slide likewise at the same time, then the opening formed in the center of the assembly decreases and eventually disappears. If the cutting members are made to slide in the other direction, then the opening reappears.

The structure of the cutting members forming the assembly of this invention enables the cutting members to not only close the opening in the center of the assembly, but also to form flat top and bottom surfaces of the assembly when the cutting members are further moved from the point where the opening has disappeared. When the cutting members are moved to the point where the opening disappears, the leading end of the convex sliding surface 2 of each cutting member 1, that is, the leftward end of the convex sliding surface of each cutting member in FIG. 2A, is exposed, so that a hexagonal recess is formed. Owing to the structure of the cutting members, the convex sliding surface 2 of the first cutting member rides on the convex sliding surface 2 of an adjacent cutting member. This is possible because the convex sliding surface 2 of the adjacent cutting member fits in the concave sliding surface 3 of the first cutting member and the first cutting member can further progress in the same direction, or, in other words, the adjacent cutting member can slide back along the concave sliding surface 3 of the first cutting member. If all cutting members move at the same time, the exposed part of the convex surface of each cutting member disappears.

Figure 4:
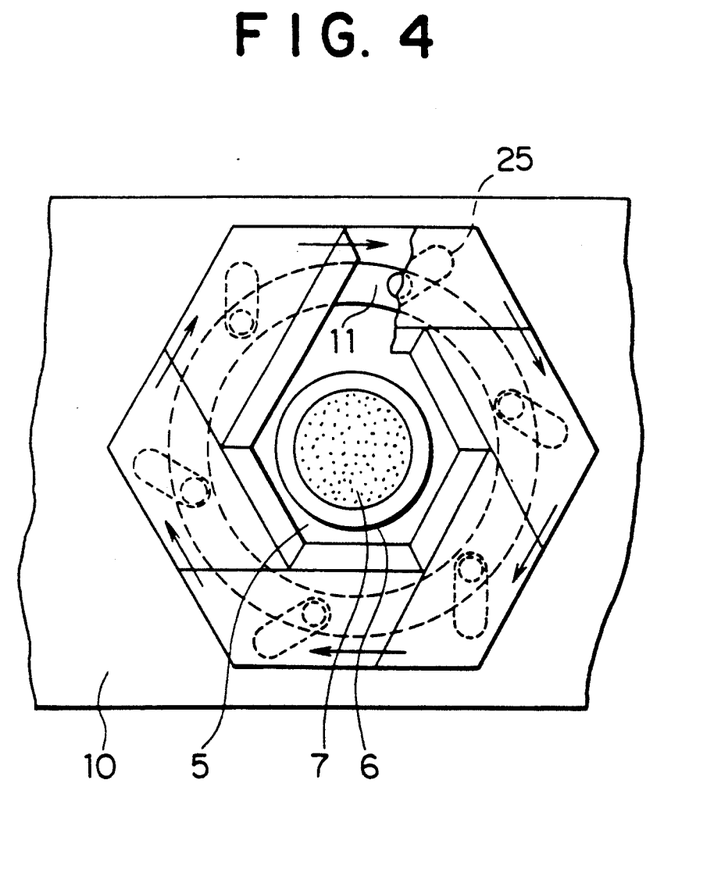
FIGS. 4, 5, and 6 are plan views of an assembly of the cutting members and their positional relationships before, during, and after a cycle of their sliding movements, respectively.

The above movement can be further explained by reference to FIGS. 4, 5, and 6. These figures show the cutting members being received in a housing 10 that is formed in the apparatus to accomodate them. The housing 10 has a hollow hexagonal space that corresponds to the periphery of the assembly when the cutting members are positioned farthest from the center, with the opening 5 at its widest area in the center. However, the movement of the cutting members in the housing 10 is the same as that referred to in the previous paragraph. In FIG. 4, the cutting members are positioned so that the sides other than the sliding surfaces of the cutting members completely contact the inner surface of the housing 10. When the cutting members are moved in the directions shown by the arrows, they slide on each other and decrease the area of the opening, and arrive at the position shown in FIG. 5, where the leading end of the convex sliding surface 2 of each cutting member is exposed, so that a hexagonal recess is formed in the center on each side of the assembly. In FIG. 1, the ridgelines 221, which are formed between the middle surface 22 of the convex sliding surface 2 and the middle surface 32 of the concave sliding surface 3, form the leading end of the convex sliding surface 2. The ridgeline 211, which is formed between the upper surface 21 of the convex sliding surface 2 and the upper surface 31 of the concave sliding surface 3, appears in FIG. 5 as a line connecting the center and an angle of the hexagonal recess. The hexagonal recess disappears when the cutting members further progress until they meet at edgepoints 212, where the two surface, the upper surface 21 of the convex sliding surface 2, and the upper surface 31 of the concave sliding surface 3, all meet, so that all the surfaces disappear from sight.

Figure 5:
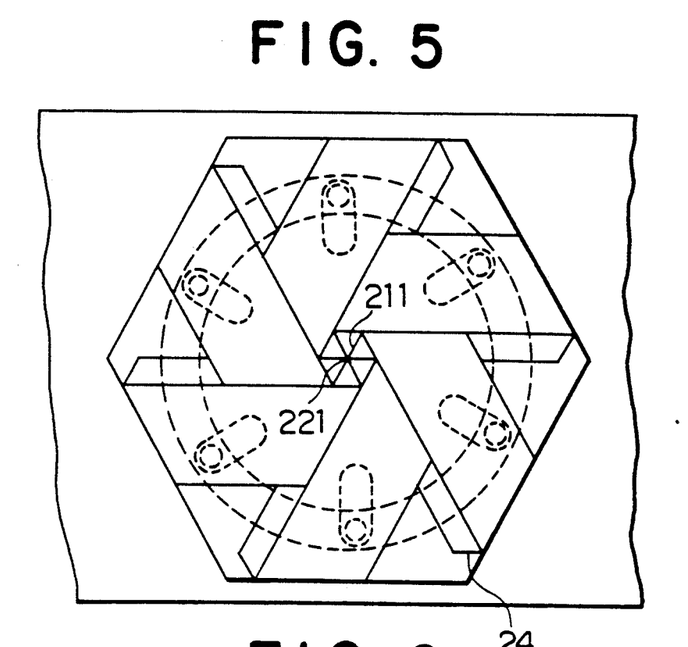
Figure 6:
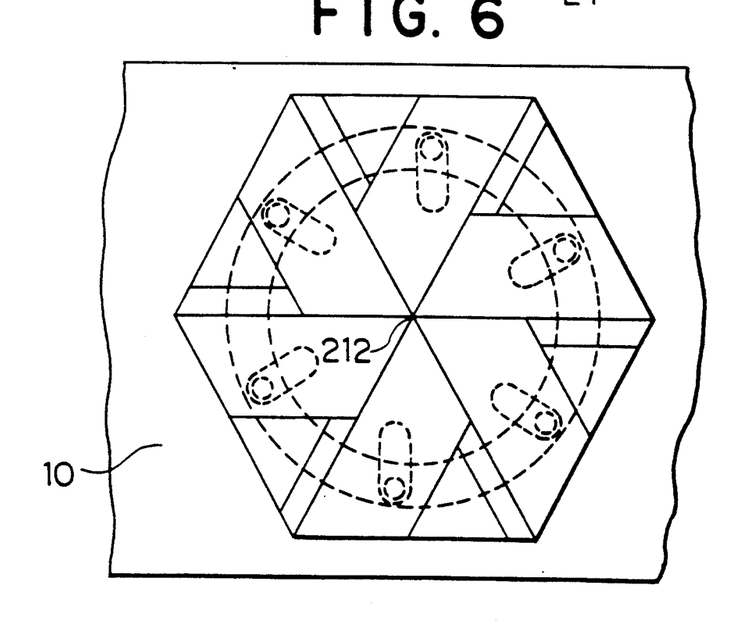

In the embodiment of FIGS. 4, 5, and 6, the positional relationship of the cutting members in FIG. 5 can proceed to the positional relationship of FIG. 6 by moving the cutting members further until each of the cutouts 24 abuts the inner surface of the housing 10.

Figure 7A:
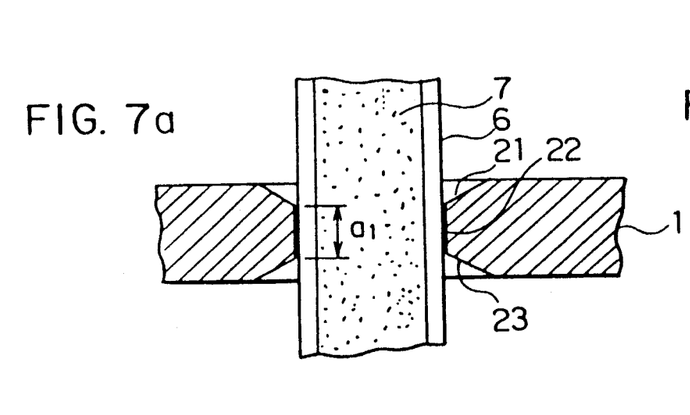
FIGS. 7A, 7B, 7C, and 7D are cross sections of portions of cutting members and a bar-shaped dough. These figures illustrate the process of cutting the dough.
Figure 7B:
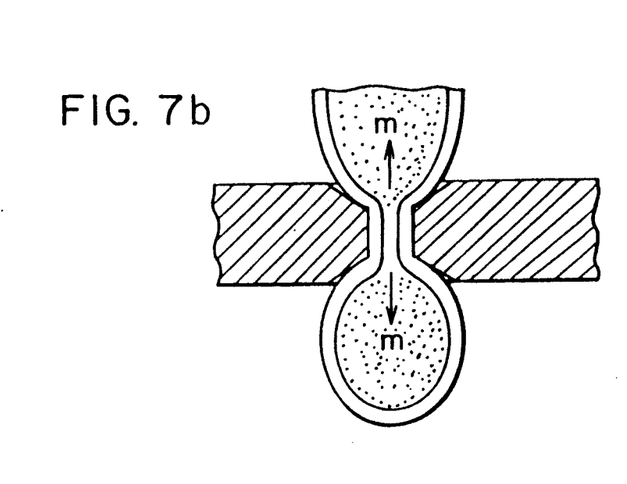
Figure 7C:
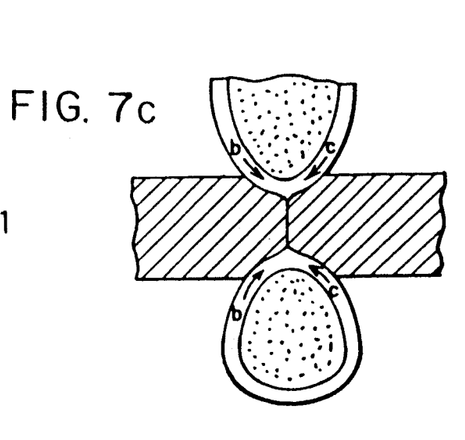

FIGS. 7A, 7B, 7C, and 7D stepwise and schematically show the effects of the cutting members of this invention. In FIG. 7A, a bar-shaped continuous dough 6, which envelopes a filling 7, is fed through the opening 5, which is surrounded by the cutting members 1. The height $a_1$ of the middle surface of the convex sliding surface is selected according to the properties of the dough materials to be cut. The middle surface 22 of the convex sliding surface of each cutting member is in contact with the dough 6. When the cutting members are moved to the center of the opening, as shown in FIG. 7B, the dough is pressed to the center of the opening and the fillings flow in the direction as shown by arrows m. When all the ridgelines 221 meet as shown in FIG. 7C, the dough 6 is divided into upper and lower parts relative to the ridgelines 221, so that they can completely envelope their respective fillings 7, so that the filling 7 of the bar-shaped dough 6 is completely closed up by the dough, thus forming the bottom half of a spherical product, while at the same time the upper part of the spherical product under the cutting members is covered with the dough to complete the product.

Figure 10:
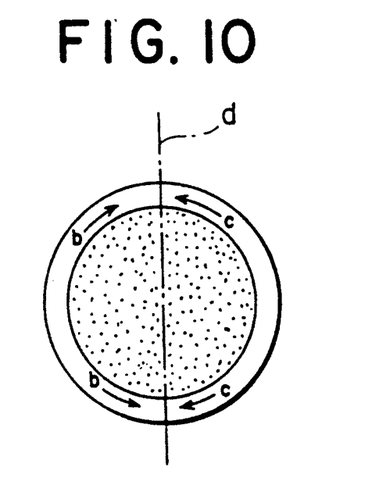
FIG. 10 is a cross section of a product produced by the apparatus of this invention. It shows the effect of cutting an enveloped body by the apparatus of this invention.
Figure 11:
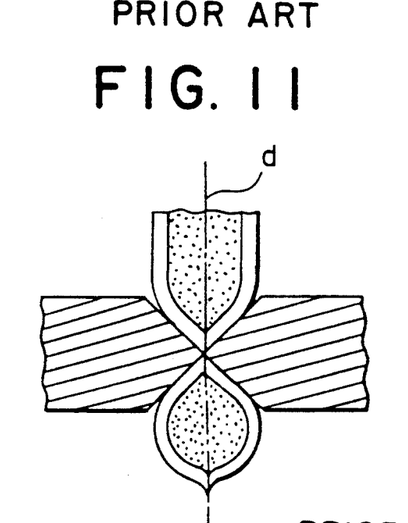
FIG. 11 is a cross section of a part of the cutting members of a conventional cutting apparatus. It schematically shows the process of cutting by such a cutting apparatus.

During this process, if upper and lower surfaces 21 and 23, which form convex sliding surfaces, are advanced towards the axis of the dough materials 6, a predetermined amount of the dough is guided or urged to the center by the upper and lower surfaces, while the progress of the middle surfaces 22 reduces the surface area of the neck of the dough. Stress shown by arrows b and c, shown both in FIGS. 7C and 10, is generated in the dough, by the urging of the sliding surfaces, especially that of the upper and lower surfaces 21 and 23 of the convex sliding surface 2, to completely cover the filling even when a highly elastic material is used. Therefore, the cutting members can cut the dough materials without thinning the dough 6 and without exposing the fillings 7.

The complementary engagement between the convex sliding surfaces 2 and the concave sliding surfaces 3 eliminates any grooves or gaps in the inner walls of the opening surrounded by the sliding surfaces, so that a product with a smooth outer cover is cut out without generating any uneven flower-like patterns caused by such gaps or grooves. Even when there are some parts of dough materials stuck to the convex sliding surfaces 2 during the cutting process, the ridgelines 211, 221, and 231 of a cutting member trace the convex sliding surface 2 of an adjacent cutting member, so that the parts can be scraped off. The recesses generated at this step are finally eliminated when all the members abut at the edge points 212 shown in FIG. 7D. Thus, the generation of any materials sticking to the assembly can be avoided during the cutting operation. Further, due to the lubricating oil retained in the oil holder 9 and made to lubricate the sliding surfaces, during the continuous operation of the cutting members the burning of materials and their sticking to the member can be avoided.

Figure 8:
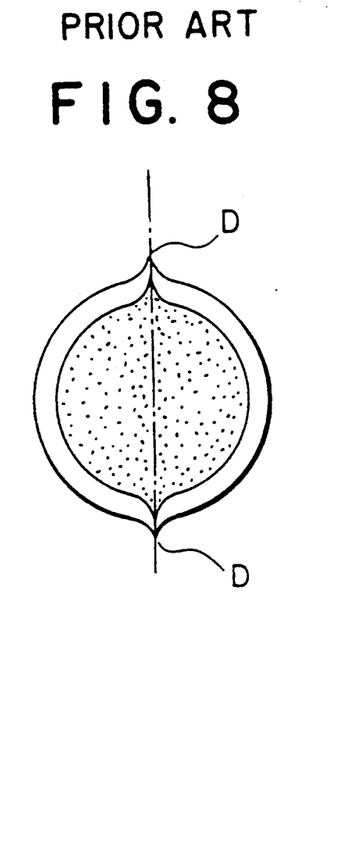
FIG. 8 is a cross section of a product produced by a conventional cutting apparatus.
Figure 9:
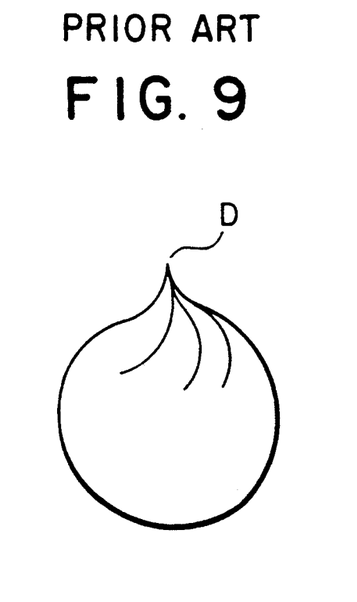
FIG. 9 is a perspective view of a product produced by a conventional cutting apparatus.
Figure 12:
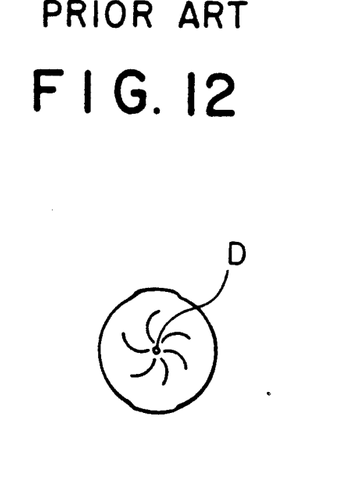
FIG. 12 is a top view of a product produced by a conventional cutting apparatus.
Figure 13:
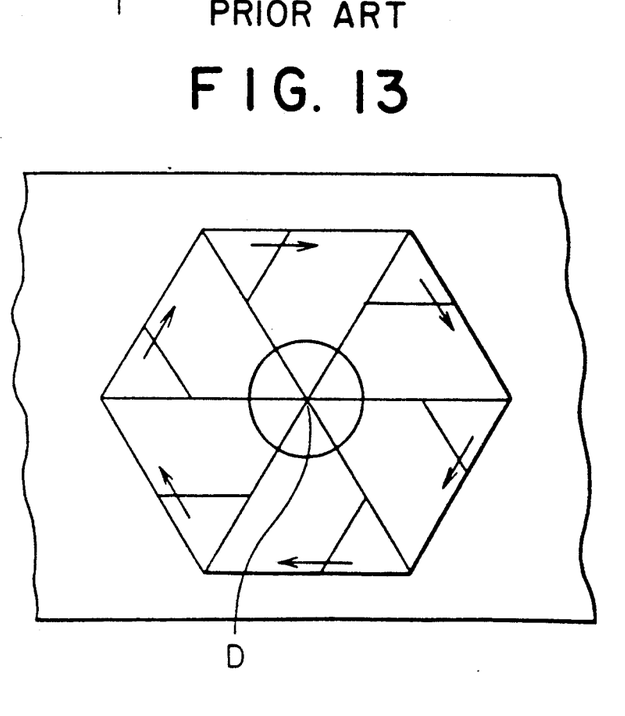
FIG. 13 is a plan view of an assembly of conventional cutting members.

By the conventional cutting processes that use sliding cutting members, central protrusions, shown in FIGS. 8, 9, and 12, are formed, and fillings are often exposed.

Figure 14:
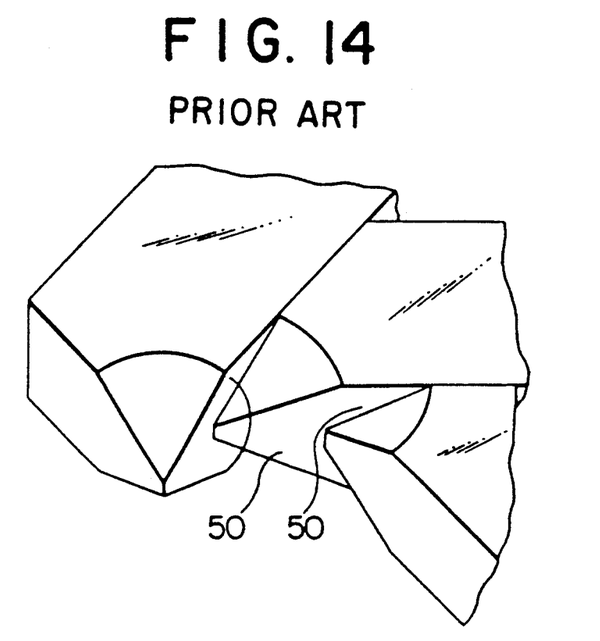
FIG. 14 is a partial perspective view of conventional cutting members in an assembled state.
Figure 15:
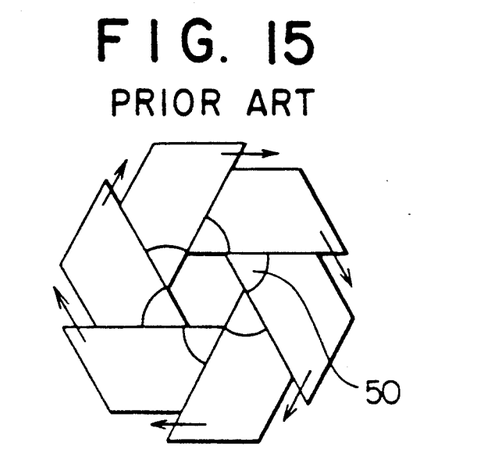
FIG. 15 is a plan view of conventional cutting members in as assembled state.
Figure 16:
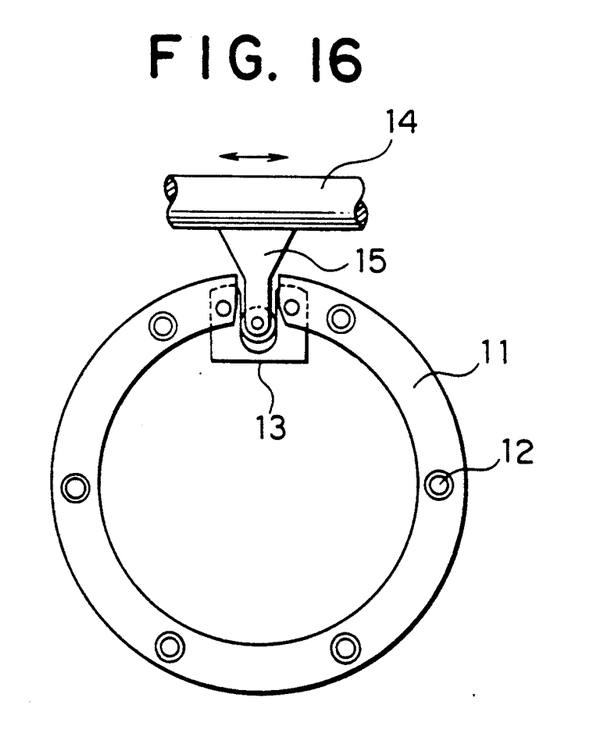
FIG. 16 is a schematic partial top view, partially broken away, of a base for driving the apparatus of this invention.
Figure 17:
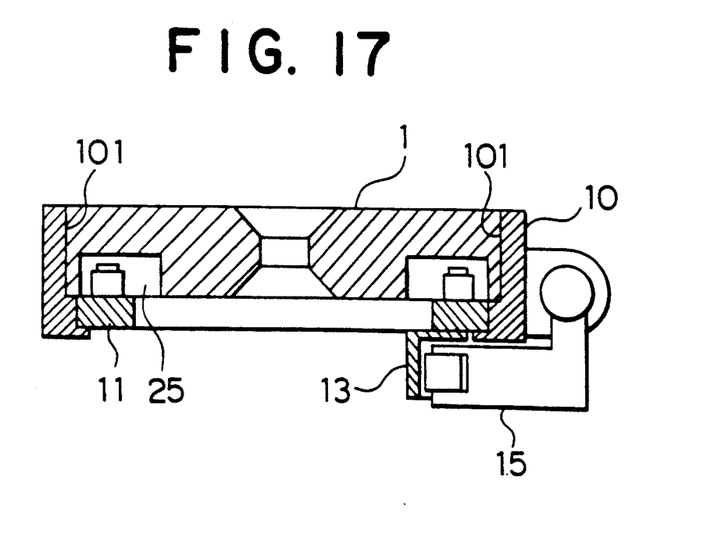
FIG. 17 is a cross section of the base.
Figure 18:
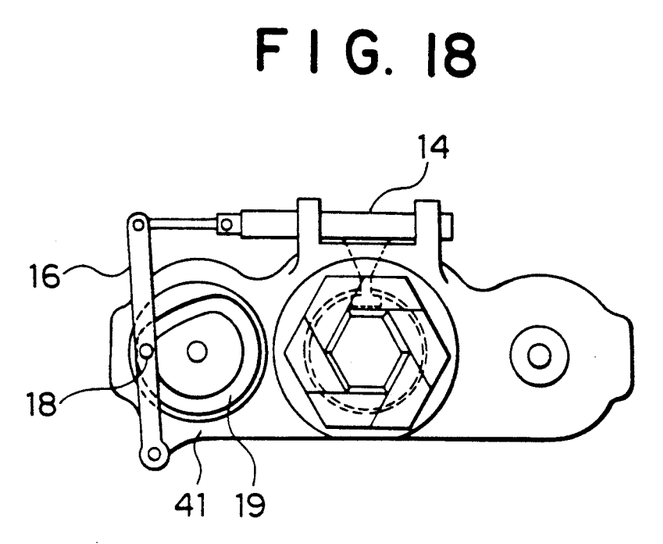
FIG. 18 is a partial top view of the apparatus. In particular, it shows a driving ring mounted on the base.

FIGS. 14 and 15 shown an assembly of the cutting members of a conventional apparatus for cutting an enveloped body. In the assembly steps 50 are generated between adjacent cutting members when they proceed to close the opening in the center, so that during the cutting process the generation of uneven flower-like patterns is inevitable. Also, some dough materials stick to the assembly.

Referring to FIGS. 16–20, mechanisms for driving the cutting member 1 will now be described. A housing 10, into which an assembly 4 is fitted, is a hexagonal frame in cross section when six members are used. On the bottom of the frame a driving ring 11 is mounted to slide the cutting members 1.

Driving pins 12 are fixed to the driving ring 11 with a predetermined distance between adjacent pins. These pins 12 extend into elongated holes 25, shown in FIGS. 2A, 4 and 17, formed in the bottom of a respective cutting member. A bar 15, which projects from a rod 14, is inserted into a pocket 13 mounted on the bottom of the ring 11. One end of the rod 14 is pivoted to an arm 16, and the other end of the arm is pivoted to a base 41. A cam follower 18, which is mounted to a part of the arm 16 in the middle, engages a grove on a cam 19, which rotates on the base. The cam 19 is fixed to a vertical driving shaft 40, which is rotatably mounted to the base 41. The driving shaft 40 is driven by a power source not shown in the drawings.

Therefore, when a driving shaft 40 rotates, the cam 19 rotates and the cam follower 18 is moved along the groove of the cam 19 to drive the driving ring 11 via the arm 16, rod 14, bar 15, and pocket 13. The driving ring 11 causes the cutting members to move, so that the outer sides of the cutting members 1 slide on the inner surface 101 of the housing, to open and close the opening 5.

Figure 19:
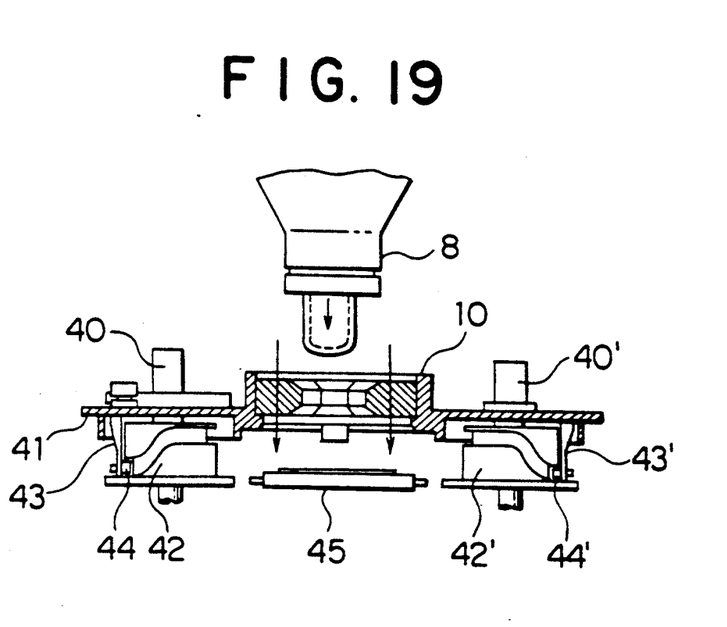
FIG. 19 is a partial cross section of the apparatus.
Figure 20:
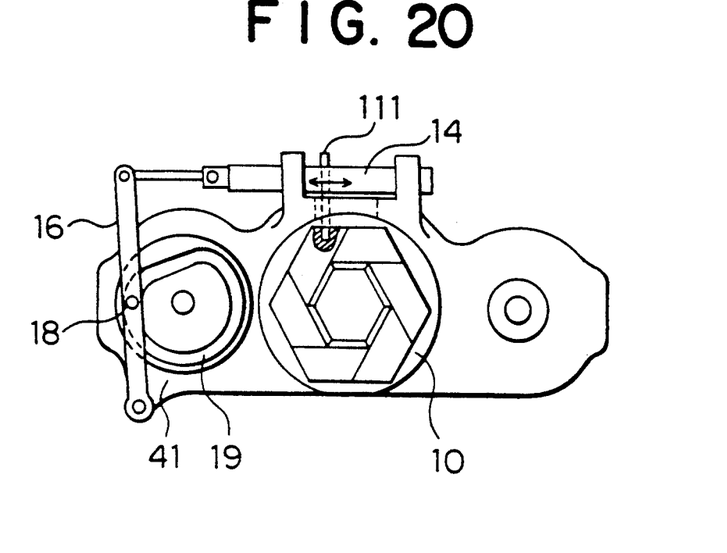
FIG. 20 is a partial top view of the apparatus.
Figure 21:
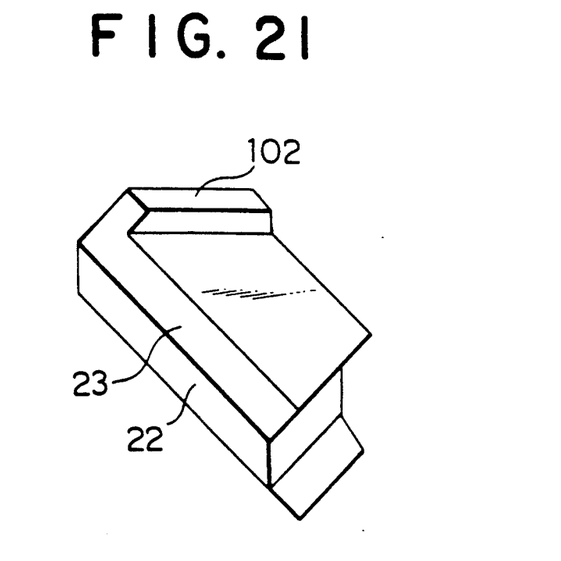
FIG. 21 is a perspective view of a cutting member with a guiding projection.
Figure 22:
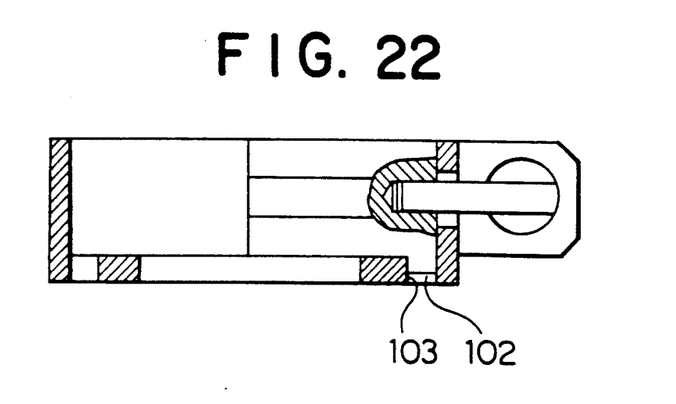
FIG. 22 is an enlarged partial cross section of the base.

A driving shaft 40' similar to the driving shaft 40 is provided in a similar manner on the other side of the base 41 across the assembly of the cutting members. Cams 42 and 42' are fixed to the driving shafts 40 and 40' under the base 41. Each cam 42, 42' has a cam groove around it that receives a cam follower 44, 44' extending from an arm 43, 43' mounted to the bottom surface of the base 41. When these cams 42 and 42' rotate, the base is caused to go up and down via the cam followers 44, 44' following the cam grooves. In FIG. 19, a feeder 8 feeds a bar-shaped dough into the opening of the cutting member assembly, and a conveyor 45 carries out products.

Figure 7D:
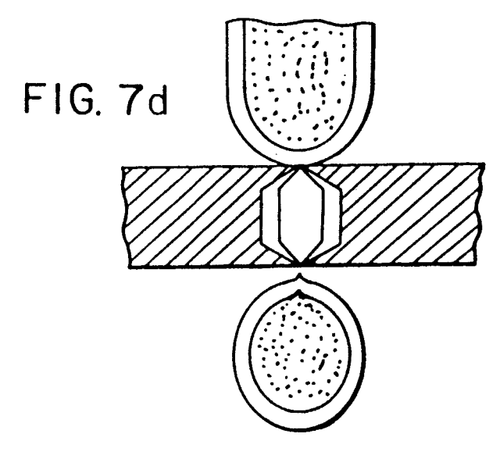

As stated above, the opening and closing movements of the opening 5 are caused by the rotation of the driving ring 11. The up and down movement of the base 41 is synchronized with the opening and closing movement such that when the base is descending, the area of the opening 5 decreases, and when it has just reached the lowest position, the opening 5 is closed as shown in FIG. 7C or 7D, and after that the opening is immediately opened and the base 41 moves up.

Figure 23:
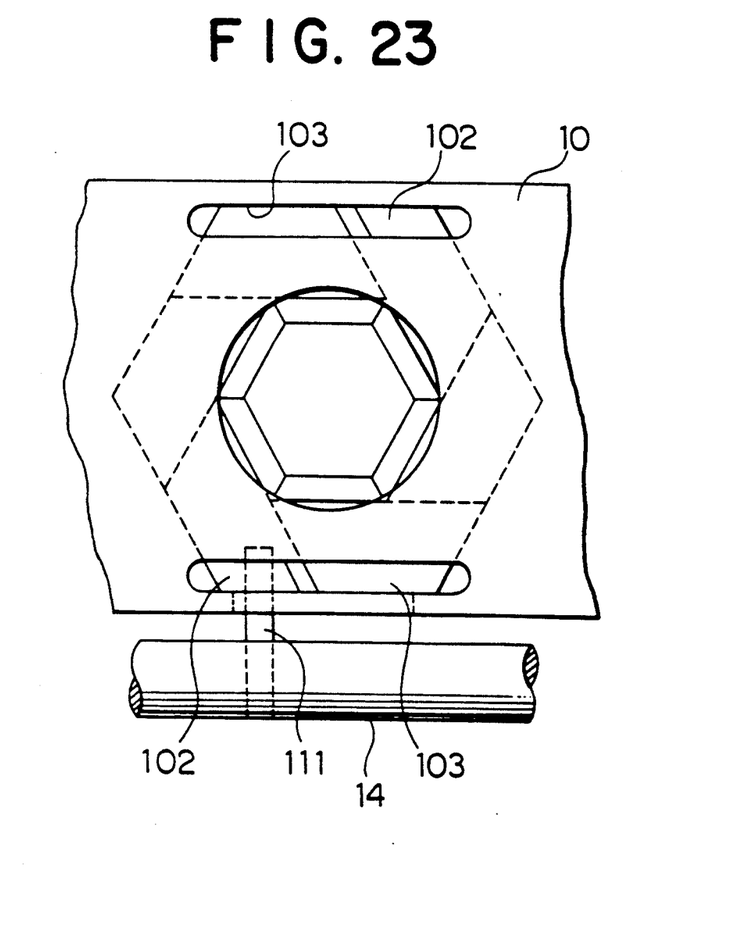
FIG. 23 is an enlarged bottom view of the base.

Referring to FIGS. 20-23, another embodiment of the mechanism for driving the cutting members will now be explained. A guiding projection 102 is provided on at least one cutting member. In FIG. 23 two slots 103, which are parallel to the inner wall of the housing 10, into which the guiding projection 102 is fitted, are provided on the bottom of the housing 10, opposite each other. One end of a driving pin 111 is inserted into a hole provided in one of the cutting members 1, and its other end is held by the rod 14. Therefore, when the driving shaft 40 rotates, the cam follower 18 is moved by the cam 19 to drive the driving pin 111 via the arm 16 and rod 14 so that the cutting member is moved. In this mechanism the cutting members having the guiding projection 102 are guided through the parallel slots 103 to move along the slots, so that the remaining cutting members are moved to open and close the opening. By providing the guide a comprising the guiding projection 102 and the parallel slots 103, the sticking or biting movements of the members during the opening and closing movement of the opening are eliminated.

EFFECTS OF THE INVENTION

A unique effect of this invention is the elimination of dough burning or any catch in the sliding movement of the cutting members, while eliminating any possibility of generating flower-like patterns on the product.

A unique effect of an embodiment of this invention is obtained by the two-step closing operation of the opening. Namely, even if a highly elastic dough material is not perfectly cut at the first cutting step, where all the ridgelines 221 meet, it can be completely divided into upper and lower parts at the second cutting step, where all the edge points 212 meet.

Figure 2B:
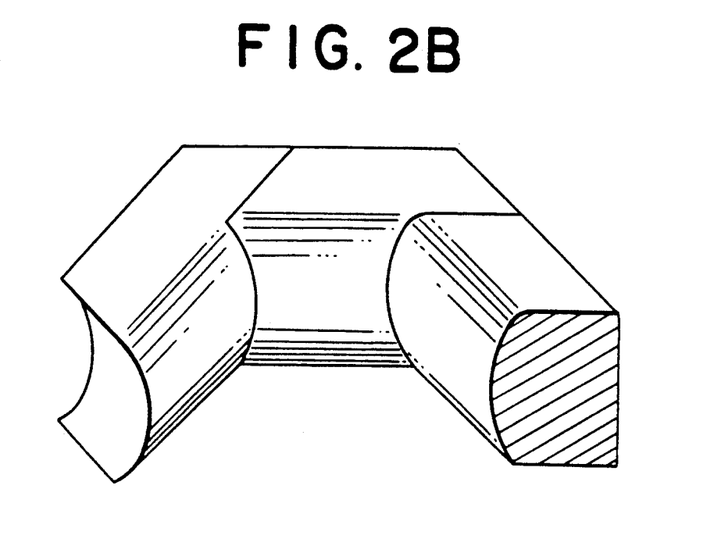
FIG. 2B is a perspective view of partially assembled cutting members of another embodiment of this invention.

An effect similar to the above is also obtained when the cutting members of this invention have a sliding surface arcuate in cross section, as shown in FIG. 2B.

As is explained above, by providing various shapes and thicknesses of cutting members according to the properties of the dough materials to be cut, the apparatus of this invention can produce a neatly shaped product enveloped by smooth outer covers, without producing uneven flower-like pattern on it.

We claim:

1. An apparatus for cutting an enveloped body comprising:
   a housing defining an opening having a central portion;
   a plurality of cutting members slidably disposed on said housing, each of said plurality of cutting members comprising:
   opposing first and second planar surfaces;
   a first side surface slidably disposed against one of plurality of edges of said housing adjacent said opening;
   a convex side surface adjacent said first side surface and extending into said opening, said convex side surface having a convex cross-section defining a central high point;
   a beveled side surface is formed between said convex side surface and said first side surface, said beveled side surface being formed at an angle relative to said first side surface;
   a concave side surface adjacent said convex side surface and having a concave cross-section defining a central low point, said concave side surface forming a ridgeline with said convex side surface such that said central low point abuts said central high point; and
   an edge point disposed at the intersection of said first plane surface, said convex side surface and said concave side surface;
   wherein the convex side surface of each of said plurality of cutting members abuts and slides against the concave side surface of an adjacent one of said plurality of cutting members when said first side surface of each of said plurality of cutting members slides against one of said plurality of edges, and
   wherein said edge points of all of said plurality of cutting members abut each other when said plurality of cutting members are in a fully-closed position.

2. An apparatus according to claim 1 wherein said plurality of cutting members are disposed in a plane, and said apparatus further comprises means connected to said housing for moving said housing in a direction perpendicular to said plane.

3. An apparatus according to claim 1 wherein
   said opposing first and second planar surfaces define first and second parallel planes, respectively;
   said convex side surface of each of said plurality of cutting members comprises a raised central surface disposed in a third plane perpendicular to said first and second planes, a first beveled surface formed between said raised central surface and said first planar surface, and a second beveled surface formed between said raised central surface and said second planar surface, and
   said concave side surface of each of said plurality of cutting members comprises an indented central surface disposed in a fourth plane perpendicular to said first and second planes, a third beveled surface formed between said indented central surface and said first planar surface, and a fourth beveled surface formed between said indented central surface and said second planar surface.

4. An apparatus according to claim 1 wherein said cross sections of said convex side surface and said concave side surface are arcuate.

5. An apparatus according to claim 1 further comprising driving means operably connected to said plurality of cutting members such that said plurality of cutting members slide against said housing in response to movement of said driving means.

6. An apparatus according to claim 5 wherein an elongated hole is formed in the second planar surface of each of said plurality of cutting members and said driving means comprises a ring having a plurality of pins, each of said pins being slidably mated to one of said elongated holes, said driving means further comprising a rod connected to said ring such that said ring is rotated in response to linear movements of said rod and said plurality of cutting members slide against said housing in response to said rotation of said ring.

7. An apparatus according to claim 1 wherein each of said concave side surfaces define an oil recess.

8. An apparatus for shaping an enveloped body comprising:
   a housing having a plurality of edges defining an opening having a central portion;
   a plurality of cutting members slidably disposed on said housing, each of said plurality of cutting members comprising:
   opposing upper and lower surfaces;
   a planar side surface slidably disposed against one of the plurality of edges of the housing adjacent the opening;
   a convex side surface adjacent the planar side surface and facing the opening, the convex side surface having a convex cross-section defining a central high part;

a beveled side surface formed between said planar side surface and said convex side surface, said beveled said surface being formed at an angle relative to said planar side surface and said convex side surface; and a concave side surface adjacent the convex side surface and opposite said planar side surface and having a concave cross-section complementary to the convex cross-section of said convex side surface, defining a central low part;

wherein the convex side surface and the convex side surface form ridgelines with said convex side surface, the convex side surface and the concave side surface defining top and bottom edge points at the intersection of the upper and lower planar surfaces and the convex side surface and the concave side surface;

wherein the convex side surface of each of a plurality of cutting members abuts the slides against the concave side surface of an adjacent one of the plurality of cutting members when the planar side surface of each of said plurality of cutting members slides against one of the plurality of edges so as to open and close the opening to cut the enveloped body passing therethrough, and wherein the central high part of all the plurality of cutting members abut each other when the plurality of cutting members slide against each other to close the opening, and the upper and lower edge points of all the plurality of cutting members abuts each other when the cutouts of all the plurality of cutting members abut their corresponding edges of the housing.

* * * * *